INVENTORS
Frank J. Rau &
Kenneth Losch

United States Patent Office 3,128,382
Patented Apr. 7, 1964

3,128,382
PHOTOSENSITIVE LINE TRACER FOR INDUSTRIAL TOOLS
Frank J. Rau, Pittsburgh, Pa., and Kenneth Losch, North Canton, Ohio, assignors to Westinghouse Electric Corporation, East Pittsburgh, Pa., a corporation of Pennsylvania
Continuation of application Ser. No. 759,243, Sept. 5, 1958. This application Feb. 27, 1962, Ser. No. 176,057
17 Claims. (Cl. 250—202)

This application is a continuation of application Serial No. 759,243, filed September 5, 1958, and assigned to Westinghouse Electric Corporation, and now abandoned.

This invention relates to the tracer art and has particular relationship to line tracers in which an industrial tool such as a cutting torch or a profiler is caused to follow a curve. Patent 2,933,612, granted April 19, 1960, to John S. Cheverton and Frans Brouwer, is incorporated herein by reference.

The Cheverton patent relates to a tracer in which an industrial tool is caused to follow a curve formed by a line drawn in pencil or ink on paper or like material. The Cheverton apparatus includes a photoelectric pick-up device which produces a pulsating signal having a wave form dependent on the instantaneous position of the pick-up relative to the line being followed. This signal controls a motor which tends to reset the pick-up so that it moves precisely along the line. The pick-up is connected through a pantograph to the tool and the tool follows the pick-up and is controlled by the curve.

The Cheverton apparatus has been constructed and operated and has produced highly satisfactory results. But this apparatus is not entirely automatic. The curve which is traced is usually closed. The Cheverton tracer would then cause the tool to move continuously in accordance with the closed curve unless stopped by an attendant. This manner of operation of the Cheverton apparatus demands that the attendant devote attention continuously to the operation.

It is then an object of this invention to provide tracer apparatus of the general type disclosed in the Cheverton patent which shall be capable of operating automatically without demanding continuous attention.

Another object of this invention is to provide tracer apparatus for controlling the movement of a tool in the operation of which the tool shall automatically come to a stop once the curve controlling the tool has been completely traced.

In accordance with this invention tracer apparatus is provided in the operation of which the movement of the tool continues only so long as the photoelectric pick-up is scanning a line and the tool is stopped while the pick-up is not scanning a line. This apparatus further includes manually actuable means for operating the apparatus independently of the line so long as the manually actuable means is actuated. Thus the operation of the apparatus may be started in the absence of a line by the manually actuable means and may be stopped in the absence of a line if the manually actuable means is unactuated.

In the usual practice of this invention the curve being scanned is provided with a gap. The operation is started near one terminal of the gap by the manually actuable means. Once the photoelectric pick-up picks up the line, the operation continues with the pick-up moved along the curve away from the gap independently of the manually actuatable means until the pick-up returns to the gap. The manually actuable means may be actuated long enough to enable the pick-up to pick up the line and then released. When the pick-up returns to the gap, the operation stops because the manual means is then unactuated.

In using apparatus in accordance with this invention a single operator may supervise the operation of a number of tool-tracer combinations. The operator starts each combination in tis turn by actuating the manual means and once it starts moves on to the next combination. Each combination once started continues to operate until the pick-up returns to the gap. At this point the operation stops until the operator returns and starts a new operation.

In addition to the facility for completely automatic operation the apparatus embodying this invention has the advantage that in any situation in which the pick-up inadvertently moves to a position in which there is no line the apparatus stops, thus excessive scrap is avoided.

In accordance with the specific aspects of this invention the means for stopping the apparatus in the absence of a line being traced is controlled by the pulsating signal received from the curve being traced. So long as this pulsating signal continues the pick-up and the tool following it continues to operate. When the pulsations are interrupted the movement of the pick-up and tool is stopped. So long as there is reasonable light contrast between the line and the surface on which it is drawn, stopping of the pick-up tool operation is independent of the amount of light that may be picked up by the pick-up since the stop mechanism is responsive to the type of signal rather than its precise magnitude. Thus the stop mechanism is within reasonable limits effective regardless of the characteristics of the surface on which the curve being scanned by the pick-up is produced.

The novel features considered characteristic of this invention are disclosed generally above. The invention itself both to its organization and as to its method of operation together with additional objects and advantages thereof will be understood from the following description of an embodiment when taken in connection with the accompanying drawings in which:

FIG. 4 is presented only for the purpose of aiding those skilled in the art in practicing this invention and not with the intention of limiting the invention in any way.

Figure 1:
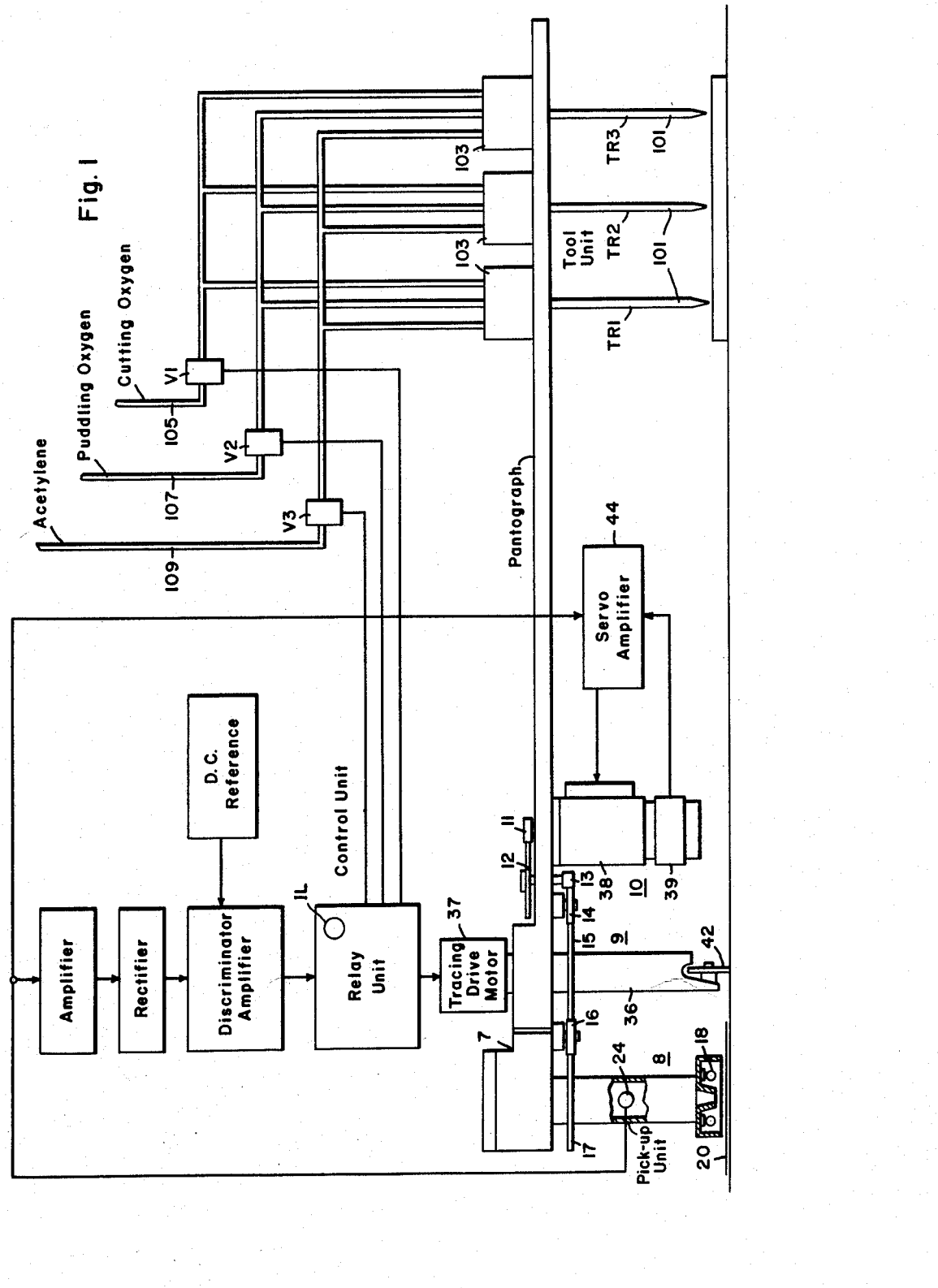
FIGURE 1 is a block diagram of a preferred embodiment of this invention.

The apparatus in accordance with this invention includes a Pick-Up Unit, a Tool Unit, a Pantograph and a Control Unit. The Pick-Up Unit may be similar to that disclosed in the Cheverton patent. So that the relationship between the apparatus disclosed herein and in the Cheverton apparatus may be understood, the labeling of the Cheverton application has been adapted to the extent practicable in the figures of this application.

The Pick-Up Unit includes a plate 7 on which is mounted a scanning head 8. The scanning head 8 includes a photo cell 24 which is vibrated with reference to the line 20 of the curve being scanned. The pick-up also includes a drive-wheel mechanism 9 and a drive 10 including a steering motor 38 and a tachometer generator 39 which produces a signal proportional to the speed of the motor 38. The drive-wheel mechanism includes a rotatable tube 36 which carries the wheel 42. The motor 38, through a gear train 11, 12, 13, 14, 15, 16, 17, rotates the tube 36 and the scanning head 8. The wheel 42 is mounted on a shaft (not shown) which is driven by the tracing drive motor 37. The steering motor 38 is controlled from a servo amplifier 44 in the Control Unit which is in turn controlled from the photo cell 24. A negative feedback signal is supplied from the tachometer to the servo amplifier to suppress any tendency to overshoot by reason of excessive velocity or acceleration of the steering motor.

Figure 2:
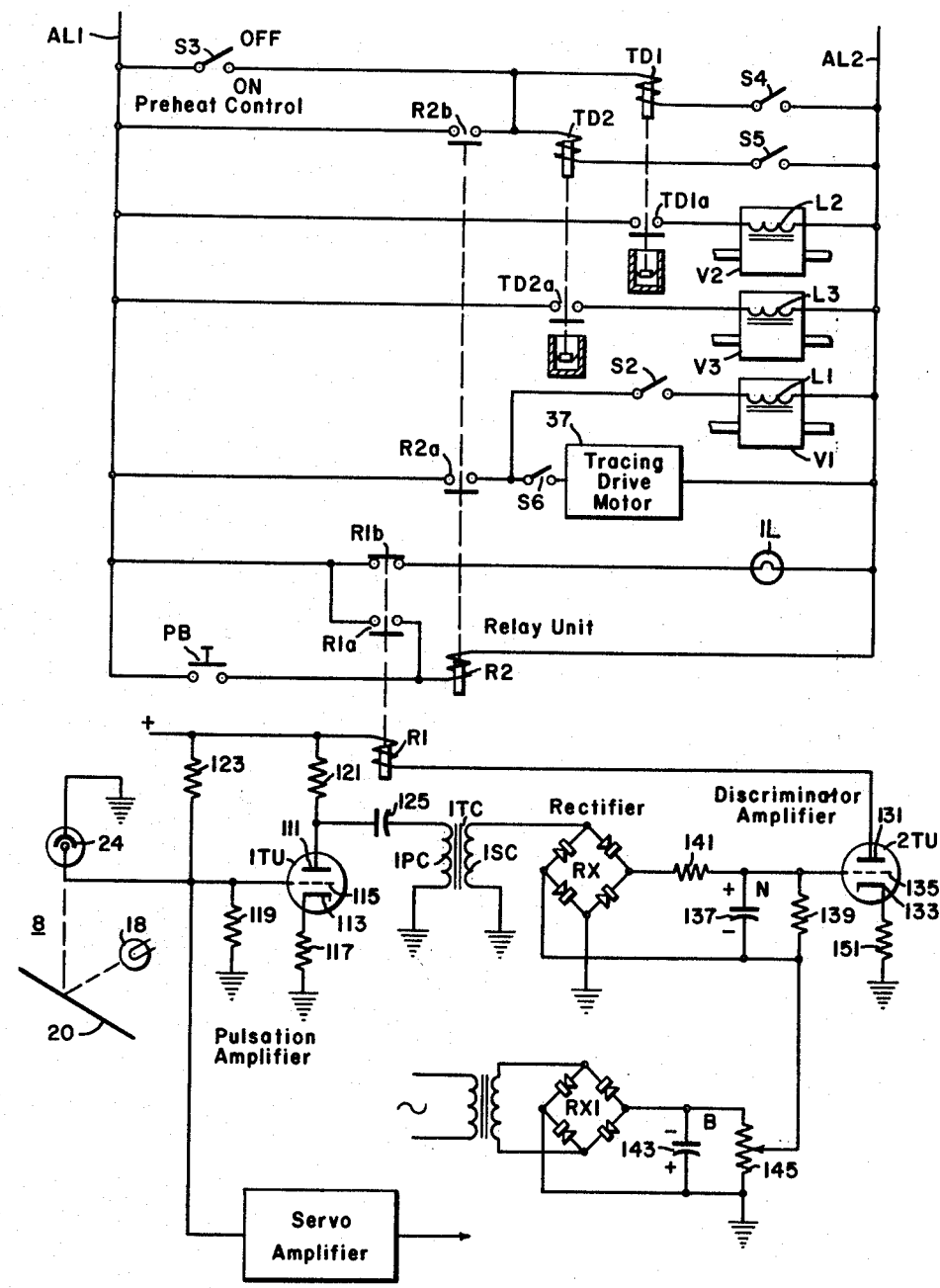
FIG. 2 is a circuit diagram of the embodiment shown in FIG. 1.

While this invention may be used to control tools of different types, it is shown in its specific aspects applied to control cutting torches. The Tool Unit includes a plurality of gas cutting torches TR1, TR2, TR3. Each of these torches is of the acetylene type and is provided with a tube 101 through which the cutting gas is projected and with the conventional gas mixer 103. Each of the mixers is supplied from a manifold controlled by suitable valves V1, V2, V3. The manifold includes a cutting-oxygen conductor 105 controlled by valve V1, a puddling-oxygen conductor 107 by valve V2 and an acetylene conductor 109 by valve V3. The puddling-oxygen is supplied at a relatively low rate and the cutting oxygen at a relatively high rate. The valves V1, V2, V3 are magnetically controlled and may be opened by energizing solenoids L1, L2, L3, respectively (FIG. 2). The torches TR1, TR2, TR3 of the Tool Unit are connected to the Pick-Up Unit through the Pantograph which may be of the conventional mechanical type. Thus, the movement of the torches is controlled through the Pick-Up Unit and this in turn is controlled by the line 20 so that the torches move corresponding to the curve of the line 20.

The Control Unit is energized from a direct-current supply and includes in addition to the servo amplifier a pulsation amplifier, a rectifier, a discriminator amplifier, and a relay unit. The relay unit is connected to control the valves V1, V2 and V3 through the solenoids L1, L2, L3 and the tracing drive motor 37.

The pulsation amplifier (FIG. 2) includes a discharge device 1TU which may be part of a double triode and which has an anode 111, a cathode 113, and a grid 115. The cathode 113 is grounded through a relatively low resistor 117. The grid 115 is grounded through a grid resistor 119 and is also connected to ground through the photoelectric device 24. The anode is connected to the positive terminal of the supply through an anode resistor 121. Through another resistor 123 a potential is impressed across the photo cell 24.

The output of the pulsation amplifier is derived from the anode circuit of 1TU through a coupling circuit including a capacitor 125 and the primary 1PC of a transformer 1TC which are connected between the anode 111 and ground. This coupling network transmits only the alternating components of any signal appearing on the anode of 1TU and thus transmits only the pulsations produced by the oscillations of the photo cell 24 with reference to the line 20. The rectifier RX is of the dry-cell bridge type and is connected to the secondary 1SC of the transformer 1TC. The transformer 1TC has a high transformation ratio so that the potential across 1SC is approximately ten times the potential across 1PC.

The discriminator amplifier includes a discharge device 2TU which may be the section of the double triode which includes 1TU and which has an anode 131, a cathode 133, and a grid 135. The discriminator amplifier also includes a time-constant network N consisting of a capacitor 137 and a resistor 139. This network N is connected through a resistor 141 between the output terminals of the rectifier RX. The discriminator amplifier also includes a biasing network B supplied with a potential from an alternating-current supply through a rectifier RX1 and including a capacitor 143 shunted by a variable resistor 145. The cathode of 2TU is grounded through a relatively low resistor. The anode 131 of 2TU is connected to the positive terminal of the direct-current supply through the coil of a relay R1 of the relay unit. The cathode 133 is grounded through a low resistor 151. The grid 135 is connected to ground through the network N and the biasing network B. The network B is so poled as to tend to block conduction of 2TU and the network N is poled to permit conduction of 2TU. Thus, for any setting of B, N is capable of causing conduction of 2TU when the potential across it exceeds a predetermined magnitude.

The potential of network N is dependent on the contrast between the line 20 being traced and the area on which the line is impressed. By properly setting B the conduction of 2TU may be so controlled that the relay R1 is actuated when the scanner 8 is scanning a line drawn to control the Tool Unit but does not conduct for the spurious variations arising from surface imperfections of the surface on which the line 20 is impressed.

The Relay Unit includes, in addition to the relay R1, a relay R2 and time-delay relays TD1 and TD2. The Relay Unit also includes a pushbutton PB and indicating lamp IL and manual switches S2, S3, S4, S5 and S6 for setting the apparatus during operation. S2 and S6 permit operation of motor 37 or supply of cutting oxygen independently of each other.

Relay R1 has a front contact R1a and a back contact R1b. Relay R2 has front contacts R2a and contacts R2b. Relay TD1 has a front contact TD1a, relay TD2 a front contact TD2a. Relay TD1 and TD2 are of the type which pull in instantaneous when current is applied to their coils and drop out only a predetermined time interval after the current through the coils is interrupted.

The Relay Unit is supplied from an alternating current commercial supply of the usual 115 volts 60 cycle type through conductors AL1 and AL2. The coil of R2 is adapted to be connected between conductors AL1 and AL2 through the pushbutton PB. This coil is also adapted to be connected between conductors AL1 and AL2 through front contact R1a. Back contact R1b connects the lamp IL between conductors AL1 and AL2. This lamp indicates that the scanner head 8 is not scanning a line.

The tracer drive motor 37 (FIG. 1) is adapted to be connected between conductors AL1 and AL2 through the front contact R2a of relay R2. Solenoid L1 which controls valve V1 is adapted to be connected between conductors AL1 and AL2 through front contact R2a and a switch S2 which must be closed to energize the solenoid L1. Solenoid L2 is adapted to be connected between conductors AL1 and AL2 through front contact TD1a. Solenoid L3 is adapted to be connected between conductors AL1 and AL2 through front contact TD2a. The coils of relay TD1 and TD2 are adapted to be connected between conductors AL1 and AL2 through front contact R2b and through switches S4 and S5, respectively. These coils are also adapted to be connected in the same way through switch S3 which is open for automatic operation and closed for manual operation.

Figure 3:
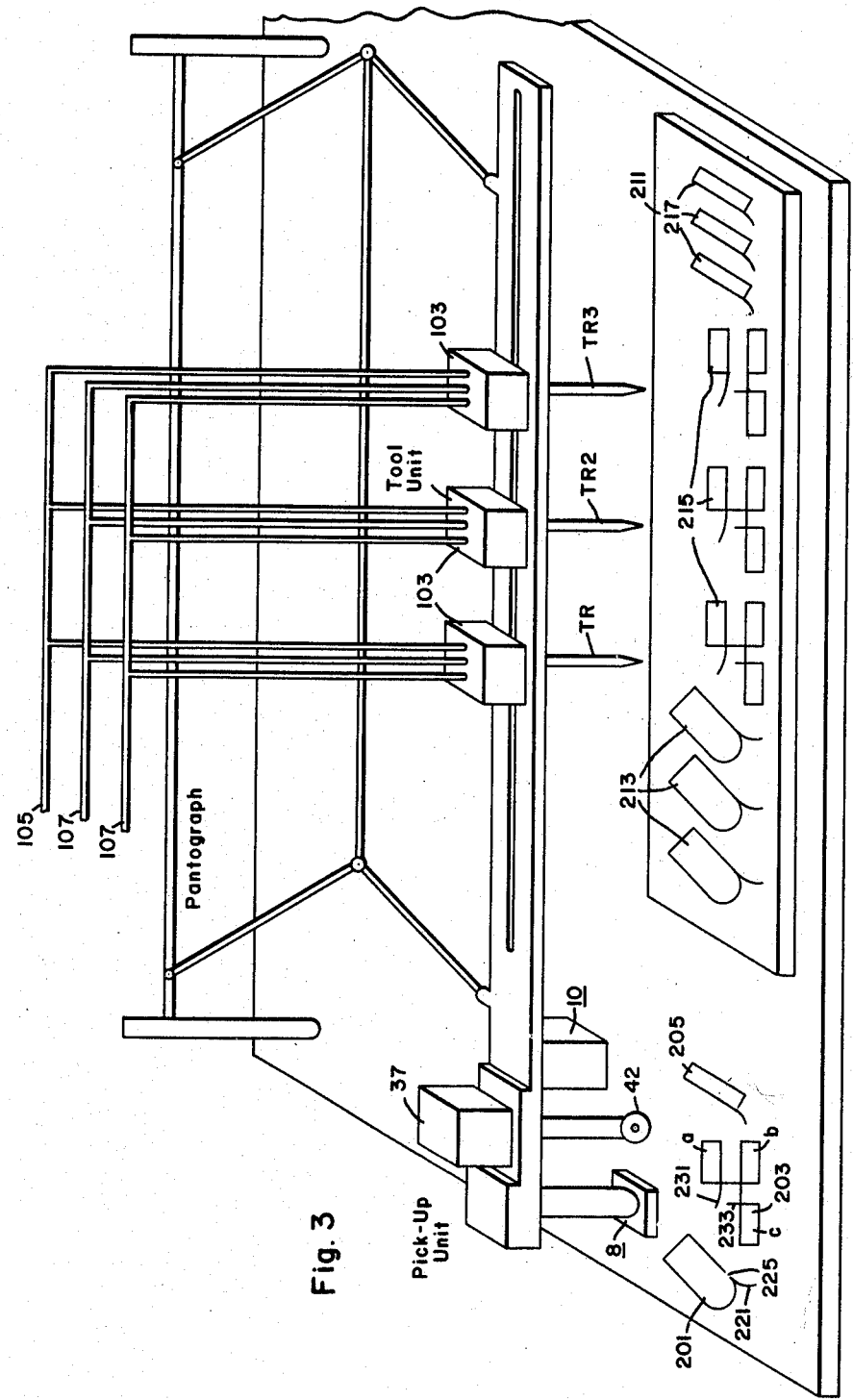
FIG. 3 is a diagrammatic presentation of the manner in which the invention is applied to the cutting out of a plurality of slabs of different shapes from a plate.
Figure 4:
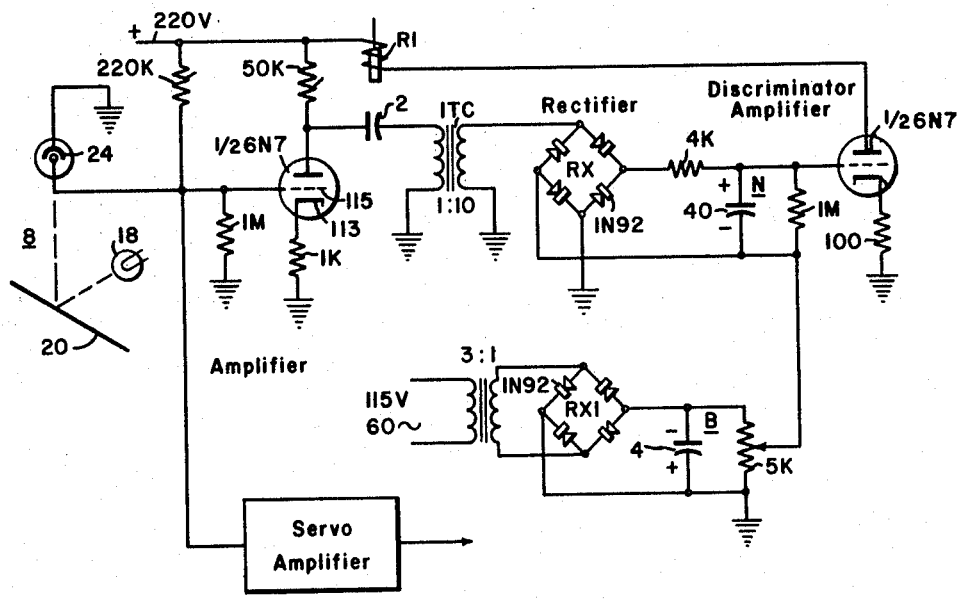
FIG. 4 is a circuit diagram similar to FIG. 2 but showing the magnitudes of the important components used in a circuit in accordance with this invention which has been constructed and found to operate satisfactorily.

FIG. 3 shows a setup for using the apparatus in accordance with this invention for a cutting operation. In this view the Pick-Up Unit and the Tool Unit are connected through the Pantograph. The Pick-Up Unit is disposed with the scanner 8 over the area where the curves 201, 203, 205 to be followed are impressed. The Tool Unit is disposed with the torches TR1, TR2, TR3 over the plate 211 from which slabs 213, 215, 217 corresponding to the curves 201, 203, 205, respectively, are to be cut. In the practice of the invention, the scanner head 8 and the other components of the Pick-Up Unit follow each curve 201, 203, 205 in its turn and the torches TR1, TR2, TR3 following the head 8 cut out the slabs 213, 215, 217 of the desired form. For each curve being traced the operation is automatic once it is started by closing the pushbutton PB.

In the standby condition of the apparatus the conductors AL1 and AL2 are energized and the direct-current supply for the pulsation amplifier, rectifier, and discriminator amplifier are energized. The pushbutton PB and the switches S2, S3, S4 and S5 are open. The photo cell is vibrating, and by reason of the vibrations produces small variations in response, but the input circuit of discharge device 1TU is not being supplied with signal potential large enough to charge network N sufficient to overcome the bias B and device 2TU is maintained nonconducting. Relay R1 is then deenergized and the indicating lamp IL is energized.

Let it be assumed that the slabs 213 on the left of the plate 211 in FIG. 3 are to be cut out. The Pick-Up Unit is then set so that the scanning head 8 will scan a point just beyond the tail 221 of the curve 201 on the left. In this position of the Pick-Up Unit the torches TR1, TR2 and TR3 are set in a position from which they can conveniently cut out the slabs 213 corresponding to the curve 201. The Pick-Up Unit is now energized so that the photo cell 24 is vibrated and switches S4 and S5 are closed. At this point, the cell 24 is not scanning a line and discharge device 2TU continues deenergized so that relay R1 is deenergized. The tracing drive motor 37 is then not energized and the apparatus is still in the quiescent condition.

To start an operation the scanner 8 is positioned so that on moving it would pick up the tail 221 of curve 201 and switches S2, S3, S4, S5 and S6 are closed. The closing of S3 energizes relays TD1 and TD2 so that valves V2 and V3 are opened supplying acetylene and puddling oxygen. This gas mixture is ignited and the work heated to a near molten state. The puddling operation is now complete.

The pushbutton PB is now closed energizing R2 and the tracing drive motor 37 and opening valve V1 so that cutting oxygen is supplied. The scanner 8 now picks up the line and at the same time the torches TR1, TR2, TR3 start a cutting operation.

Discharge device 2TU and relay R1 are then energized. The scanner 8 and with it the torches will follow the tail 221 and on reaching the gap 225 will cross the gap in a straight line rather than following the cusp of the curve 201 at the gap. When scanner 8 again picks up the line relay R2 is locked in at contact R1a and the operator may release the pushbutton PB. The operator now opens switch S3 and turns to the next cutting assembly. The scanning head and the Tool Unit continue to follow the curve on the left and three slabs corresponding to the curve are cut out.

While the operator is engaged in starting the next operation, the apparatus shown in FIG. 3 continues to operate with the scanning head 8 scanning the left hand curve 201 and the torches TR1, TR2 and TR3 cutting out three slabs 213. This operation continues until the scanning head 8 again scans the gap 225 in the curve. At this point, the pulsating potential in the input of 1TU is interrupted and the discharge of network N starts. The gap 225 is of such length that network N discharges before the scanning head 8 has passed over the gap. Discharge device 2TU is then deenergized, deenergizing relay R1 and energizing the indicating lamp IL. Relay R2 is then deenergized, deenergizing the tracing drive 37. In addition, solenoid L1 is immediately deenergized and solenoids L2 and L3 are deenergized after TD1 and TD2 time out. Valve V1 is first closed and is followed by valves V2 and V3 and the movement of the Pick-Up Unit and the current is stopped. An operation is now completed.

When the operator is ready he may now start another operation in the manner just disclosed. The first operation was carried out while the operator's attention was devoted to other apparatus.

In the case of curve 203 there is no gap in the curve. The movement of the scanner 8 starts at the tail 231 and follows the rectangles *a*, *b* and *c* in succession. The scanner passes from rectangle *c* to line 233 and stops at the end of this line. In this case the pushbutton PB may be released and S3 opened as soon as the scanner 8 picks up the tail 231. Rectangles 203 may be used in chain cutting. Three rectangles are cut out automatically.

While a preferred embodiment of this invention has been disclosed herein, it is realized that many modifications thereof are feasible. This invention, then is not to be restricted except insofar as is necessitated by the spirit of the prior art.

We claim as our invention:

1. Apparatus for performing an operation on work with tool means, said operation being governed by a curve formed by a line on an area, said line having a different light reflecting ability from adjacent regions of said area, said curve being interrupted by a gap, said apparatus including means connected to said tool means actuable for operating said tool means, photoelectric scanning means cooperative with said line for scanning said line, means connected to said scanning means and responsive thereto for moving said scanning means so that said scanning means follows said line, connections between said scanning means and said operating means for moving said tool means so that said tool means follows said scanning means, means connected to said scanning means and to said operating means and automatically responsive to said scanning means for conditioning said operating means to operate so long as said scanning means scans a line and for interrupting said conditioning while said scanning means is not scanning a line, and manually actuable means connected to said conditioning means for causing said conditioning means to condition as aforesaid when said scanning means does not scan a line so long as said manually actuable means remains actuated.

2. Apparatus for performing an operation on work with tool means, said operation being governed by a curve formed by a line on an area, said line having a different light reflecting ability from adjacent regions of said area, said apparatus including means connected to said tool means actuable for operating said tool means, photoelectric scanning means cooperative with said line for scanning said line, said scanning means including signal pick-up means and means connected to said pick-up means for producing a periodic pulsating signal having a wave form dependent on the optical displacement of said pick-up means from said line only while said scanning means is scanning said line, means connected to said scanning means and responsive thereto for moving said scanning means so that said scanning means follows said line, connections between said scanning means and said tool means for moving said tool means so that said tool means follows said scanning means, means connected to said scanning means and to said operating means and automatically responsive to the pulsations of said pulsating signal for conditioning said operating means to operate so long as said pulsating signal is present and for interrupting said conditioning while said pulsating signal is absent, and manually actuable means connected to said conditioning means for causing said conditioning means to condition as aforesaid while said pulsating signal is absent so long as said manually actuable means remains actuated.

3. Apparatus for performing an operation on work with tool means, said operation being governed by a curve formed by a line on an area, said line having a different light reflecting ability from adjacent regions of said area, said apparatus including means connected to said tool means actuable for operating said tool means, photoelectric scanning means cooperative with said line for scanning said line, said scanning means including signal pick-up means and means connected to said pick-up means for producing a periodic pulsating signal having a wave form dependent on the optical displacement of said pick-up means from said line only while said scanning means is scanning said line, means connected to said scanning means and responsive thereto for moving said scanning means so that said scanning means follows said line, connections between said scanning means and said tool means for moving said tool means so that said tool means follows said scanning means, means connected to said scanning means and to said operating means and automatically responsive to the pulsations of said pulsating signal for conditioning said operating means to operate so long as said pulsating signal is present and for interrupting said conditioning while said pulsating signal is absent, and manually actuable means connected to said conditioning means for causing said conditioning means to condition as aforesaid while said pulsating signal is absent so long as said manually actuable means remains actuated, said conditioning means including means suppressing spurious automatic response to the absence of said pulsating signal arising from imperfections in said line.

4. Apparatus for performing an operation on work with tool means, said operation being governed by a curve formed by a line on an area, said line having a different light reflecting ability from adjacent regions of said area, said apparatus including means connected to said tool means actuable for operating said tool means, photoelectric scanning means cooperative with said line for scanning said line, said scanning means including signal pick-up means and means connected to said pick-up means for producing a periodic pulsating signal having a wave form dependent on the optical displacement of said pick-up means from said line only while said scanning means is scanning said line, means connected to said scanning means and responsive thereto for moving said scanning means so that said scanning means follows said line, connections between said scanning means and said tool means for moving said tool means so that said tool means follows said scanning means, means connected to said scanning means and to said operating means and automatically responsive to the pulsations of said pulsating signal for conditioning said operating means to operate so long as said pulsating signal is present and for interrupting said conditioning while said pulsating signal is absent, and manually actuable means connected to said conditioning means for causing said conditioning means to condition as aforesaid while said pulsating signal is absent so long as said manually actuable means remains actuated, said conditioning means including timing means responsive to said pulsations for preventing said automatic response to the absence of said pulsations unless the duration of said absence is at least of a predetermined magnitude.

5. Apparatus for performing an operation on work with tool means, said operation being governed by a leading pattern means having a contour to be followed, said pattern means being capable of cooperating with photoelectric means to produce a signal corresponding to said contour, said contour being interrupted by a gap, said apparatus including means connected to said tool means actuable for operating said tool means, photoelectric scanning means cooperative with said pattern means for scanning said contour, means connected to said scanning means and responsive thereto for moving said scanning means so that said scanning means follows said contour, connections between said scanning means and said operating means for moving said tool means so that said tool means follows said scanning means, means connected to said scanning means and to said operating means and automatically responsive to said scanning means for conditioning said operating means to operate so long as said scanning means scans a contour and for interrupting said conditioning while said scanning means is scanning said gap, and manually actuable means connected to said conditioning means for causing said conditioning means to condition as aforesaid while said scanning means is scanning said gap so long as said manually actuable means remains actuated.

6. Apparatus for performing an operation on work with tool means, said operation being governed by a curve formed by a line on an area, said line having a different light reflecting ability from adjacent regions of said area, said curve being interrupted by a gap, said apparatus including means connected to said tool means actuable for operating said tool means, photoelectric scanning means cooperative with said line for scanning said line with a periodic movement transversely thereof, means connected to said scanning means and responsive thereto for moving said scanning means so that said scanning means follows said line, connections between said scanning means and said operating means for moving said tool means so that said tool means follows said scanning means and means connected to said scanning means and to said operating means and automatically responsive to the type of output from said scanning means rather than the precise amount of light reflected for conditioning said operating means to operate so long as said scanning means scans a line and for interrupting said conditioning while said scanning means is not scanning a line.

7. Apparatus for performing an operation on work with tool means, said operation being governed by a leading pattern means having a contour to be followed, said pattern means being capable of cooperating with photoelectric means to produce a signal corresponding to said contour, said contour including means capable of producing a response to said photoelectric means which is different from the response produced by the remainder of said contour, said apparatus including means connected to said tool means actuable for operating said tool means, photoelectric scanning means cooperative with said pattern means for scanning said contour, means connected to said scanning means and responsive thereto for moving said scanning means so that said scanning means follows said contour, connections between said scanning means and said operating means for moving said tool means so that said tool means follows said scanning means, means connected to said scanning means and to said operating means and automatically responsive to said scanning means for conditioning said operating means to operate so long as said scanning means scans said remainder of said contour and for interrupting said conditioning while said scanning means is scanning said different response producing means, and manually actuable means connected to said conditioning means for causing said conditioning means to condition as aforesaid while said scanning means is scanning said different response producing means so long as said manually actuable means remains actuated.

8. Apparatus for performing an operation on work with tool means, said operation being governed by a curve formed by a line on an area, said line having a different light reflecting ability from adjacent regions of said area, said curve including means capable of producing a response to photoelectric means which is different from the response produced by the remainder of said curve, said apparatus including means connected to said tool means actuable for operating said tool means, photoelectric scanning means cooperative with said line for scanning said line, means connected to said scanning means and responsive thereto for moving said scanning means so that said scanning means follows said line, connections between said scanning means and said operating means for moving said tool means so that said tool means follows said scanning means, means connected to said scanning means and to said operating means and automatically responsive to said scanning means for conditioning said operating means to operate so long as said scanning means scans said remainder of said curve and for interrupting said conditioning while said scanning means is scanning said different response producing means, and manually actuable means connected to said conditioning means for causing said conditioning means to condition as aforesaid when said scanning means is scanning said different response producing means so long as said manually actuable means remains actuated.

9. Apparatus for performing an operation on work with tool means, said operation being governed by a leading pattern means having a contour to be followed, said pattern means being capable of cooperating with scanning means to produce a signal corresponding to said contour, said contour including means capable of producing a response to said scanning means which is different from the response produced by the remainder of said contour, said apparatus including means connected to said tool means actuable for operating said tool means, scanning means cooperative with said pattern means for scanning said contour, means connected to said scanning means and responsive thereto for moving said scanning means so that said scanning means follows said contour, connections between said scanning means and said operating means for moving said tool means so that said tool means follows said scanning means, means connected to said scanning means and to said operating means and automatically responsive to said scanning means for conditioning said operating means to operate so long as said scanning means scans said remainder of said contour and for interrupting said conditioning while said scanning means is scanning said different response producing means, and manually actuable means connected to said conditioning means for causing said conditioning means to condition as aforesaid while said scanning means is scanning said different response producing means only so long as said manually actuable means remains actuated.

10. Apparatus for performing an operation on work with tool means, said operation being governed by a curve formed by a line on an area, said line having a different light reflecting ability from adjacent regions of said area, said apparatus including means connected to said tool means actuable for operating said tool means, photoelectric scanning means cooperative with said line for scanning said line, said scanning means including pick-up means responsive to said line to produce pulsations only while said scanning means is scanning said line, means connected to said scanning means and responsive thereto for moving said scanning means so that said scanning means follows said line, connections between said scanning means and said tool means for moving said tool means so that said tool means follow said scanning means, and means connected to said scanning means and to said operating means and automatically responsive to said pulsations for conditioning said operating means to operate so long as said scanning means produces pulsations and for interrupting said conditioning while said scanning means does not produce pulsations.

11. Apparatus for performing an operation on work with tool means, said operation being governed by a curve formed by a line on an area, said line having a different light reflecting ability from adjacent regions of said area, said apparatus including means connected to said tool means actuable for operating said tool means, photoelectric scanning means cooperative with said line for scanning said line, said scanning means including pick-up means responsive to said line to produce pulsations only while said scanning means is scanning said line, means connected to said scanning means and responsive thereto for moving said scanning means so that said scanning means follows said line, connections between said scanning means and said tool means for moving said tool means so that said tool means follows said scanning means, and means connected to said scanning means and to said operating means and automatically responsive to said pulsations for conditioning said operating means to operate and said moving means to move so long as said scanning means produces pulsations and for interrupting said conditioning while said scanning means does not produce pulsations.

12. Apparatus for performing an operation on work with tool means, said operation being governed by a curve formed by a line on an area, said line having a different light reflecting ability from adjacent regions of said area, said apparatus including photoelectric scanning means cooperative with said line for scanning said line, said scanning means including pick-up means responsive to said line to produce pulsations only while said scanning means is scanning said line, moving means connecting said scanning means and said tool in lead-follow relationship operable to cause said tool to trace a curve geometrically similar to said governing curve, and means connected to said scanning means and to said moving means and automatically responsive to said pulsations for conditioning said moving means to operate to cause said tool to trace so long as said scanning means produces pulsations and for interrupting said conditioning while said scanning means does not produce pulsations.

13. Apparatus for performing an operation on work with tool means, said operation being governed by a curve formed by a line on an area, said line having a different light reflecting ability from adjacent regions of said area, said apparatus including means for supplying alternating current, means for supplying direct current, photoelectric scanning means connected to said alternating current and cooperative with said line for scanning said line by sensing periodically back and forth across said line, said periodic sensing being synchronized with said alternating current and producing pulsations only while said scanning means is scanning said line, means connected to said scanning means and to said tool for actuating said tool to perform an operation on said work as said scanning means scans said line, said operation being governed by said curve through the scanning of said line by said scanning means, and means connected in power deriving relationship with said direct current supply means and in pulsation receiving relationship with said scanning means, and in controlling relationship with said actuating means for actuating said tool to perform so long as said scanning means produces pulsations and for interrupting said actuating while said scanning means does not produce pulsations.

14. Tracer apparatus for following a leading contour means including sensing means, means actuating said sensing means to sense back and forth generally transversely to said contour means, said sensing means producing pulsations as it senses back and forth as aforesaid, means connected to said sensing means and responsive to said pulsations for advancing said sensing means along said contour means with the back and forth sensing generally centered along said contour means, switch means connected to said advancing means and having an operating condition in which it conditions said advancing means to advance said sensing means along said contour means and a non-operating condition in which it prevents said advancing means from advancing said sensing means along said contour means, and means connected to said sensing means and operable by said pulsations for maintaining said switch means in said operating condition only so long as said pulsations exist.

15. Tracer apparatus for causing a tool to follow a leading contour means including sensing means, means actuating said sensing means to sense back and forth generally transversely to said contour means, said sensing means producing pulsations as it senses back and forth as aforesaid, means connected to said sensing means and responsive to said pulsations for advancing said sensing means along said contour means with the back-and-forth sensing generally centered along said contour means, means connected to said sensing means and to said tool for causing said tool to follow said sensing means, means connected to said tool for actuating said tool to carry out a tool operation, switch means connected to said tool actuating means and having an operating condition in which it conditions said tool-actuating means to actuate said tool to carry out said tool operation and a non-operating condition in which it prevents said tool-actuating means from actuating said tool from carrying out said tool operation, and means connected to said sensing means and operable by said pulsations for maintaining said switch means in said operating condition only so long as said pulsations exist.

16. Tracer apparatus for following a contour including sensing means, means actuating said sensing means to sense repeatedy across said contour, said sensing means producing one type of signal in response to crossing of said contour, said one type having a characteristic which is independent of the magnitude of said signal, and a different type of signal when said contour is not crossed, said different type having a characteristic which is independent of the magnitude of said signal and which is different than the characteristic of said one type of signal, means connected to said sensing means and responsive to the presence of the first said type of signal for advancing said sensing means along said contour, switch means connected to said advancing means and having an operating condition in which it conditions said advancing means to advance said sensing means along said contour and a non-operating condition in which it prevents said advancing means from advancing said sensing means along said contour, and means connected to said sensing means and operable in response to the characteristic of the type of signal produced and independently of the precise magnitude thereof for maintaining said switch means in said operating condition only so long as the first said type of signal exists.

17. Apparatus for performing an operation on work with tool means, said operation being governed by a leading pattern means having a contour to be followed, means for scanning periodically from one side to the other of said contour, said pattern means being capable of cooperating with scanning means to produce one type of signal upon crossing of said contour, said one type having a characteristic which is independent of the magnitude of said signal, said pattern means adjacent said contour producing a response to said scanning means which gives a different type of signal from the response produced by the crossing of said contour, said different type having a characteristic which is independent of the magnitude of said signal and which is different than the said characteristic of said one type of signal, said apparatus including means connected to said tool means actuable for operating said tool means, means connected to said scanning means and responsive thereto for moving said scanning means so that said scanning means follows along said contour, connections between said scanning means and said operating means for moving said tool means so that said tool means follows said scanning means, and means connected to said scanning means and to said operating means and automatically responsive to the said characteristic of the first said type of signal of said scanning means for conditioning said operating means to operate so long as said scanning means scans across said contour and for interrupting said conditioning while said scanning means does not scan across said contour and produces said different type of signal.

References Cited in the file of this patent

UNITED STATES PATENTS

| | | |
|---|---|---|
| 1,923,208 | Howey | Aug. 22, 1933 |
| 2,069,508 | Rutemiller et al. | Feb. 2, 1937 |
| 2,074,251 | Braun | Mar. 16, 1937 |
| 2,121,211 | Padva | June 21, 1938 |
| 2,261,644 | Cockrell | Nov. 4, 1941 |
| 2,489,305 | McLennan | Nov. 29, 1949 |
| 2,499,178 | Berry et al. | Feb. 28, 1950 |
| 2,729,742 | Brauer | Jan. 3, 1956 |
| 2,814,725 | Jacobs et al. | Nov. 26, 1957 |
| 2,861,192 | Moreau et al. | Nov. 18, 1958 |
| 2,868,993 | Henry | Jan. 13, 1959 |
| 2,933,612 | Cheverton et al. | Apr. 19, 1960 |
| 2,933,668 | Brouwer | Apr. 19, 1960 |